United States Patent [19]

Rice et al.

[11] Patent Number: 4,692,006

[45] Date of Patent: Sep. 8, 1987

[54] VIDEO VIEWFINDER SYSTEM

[75] Inventors: Mark Rice; Douglas Meisner, both of Minneapolis, Minn.

[73] Assignee: Interscan, Incorporated, Minneapolis, Minn.

[21] Appl. No.: 834,429

[22] Filed: Feb. 28, 1986

[51] Int. Cl.⁴ .................... G03D 13/02; G03D 17/04
[52] U.S. Cl. ...................................... 354/75; 354/188; 354/200; 354/219; 358/224
[58] Field of Search .................... 354/75, 76, 219, 224, 354/225, 199, 200, 201, 187, 188; 358/224, 225, 909

[56] References Cited

U.S. PATENT DOCUMENTS 2,709,391  5/1955  Reeves ................................ 358/224
3,883,883  5/1975  Sano et al. ............................ 354/75
4,303,322  12/1981 Someya ............................... 358/224

Primary Examiner—A. A. Mathews
Attorney, Agent, or Firm—Peterson, Wicks, Nemer & Kamrath

[57] ABSTRACT

A video viewfinder system according to the preferred teachings of the present invention is shown for use with a camera of a standard design. The video viewfinder system includes video monitors for displaying derived images from a video camera of a primary image formed by the lens of the camera to allow the photographer to view the primary image formed by the camera lens at locations remote from the camera. Specifically, the video viewfinder system of the preferred form includes a viewfinder hood secured to the camera having a ground glass located at its first end for forming the primary image by the camera lens and with the video camera located at its second end and aimed at the primary image. To provide more uniform brightness of the derived image, a fresnel lens is associated with the ground glass for concentrating the outgoing light rays from the ground glass to the video camera and an anti-vignetting filter having gradating density from its center outward is provided for selectively absorbing the outgoing light rays from the ground glass to the video camera.

20 Claims, 3 Drawing Figures

U.S. Patent  Sep. 8, 1987  4,692,006
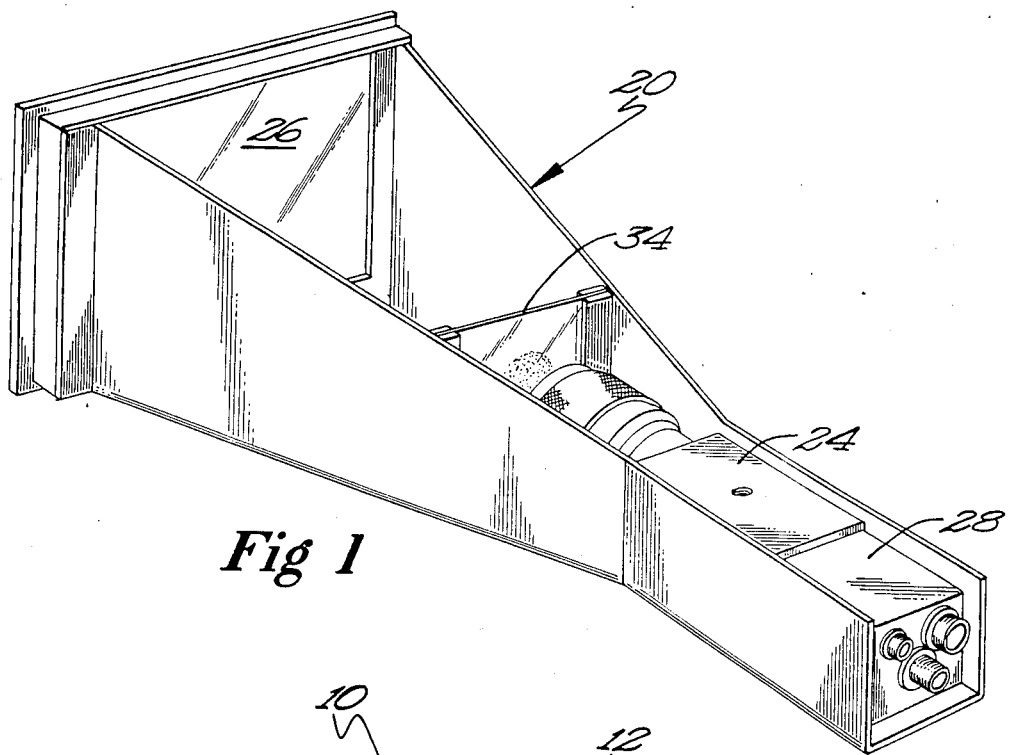
Fig 1
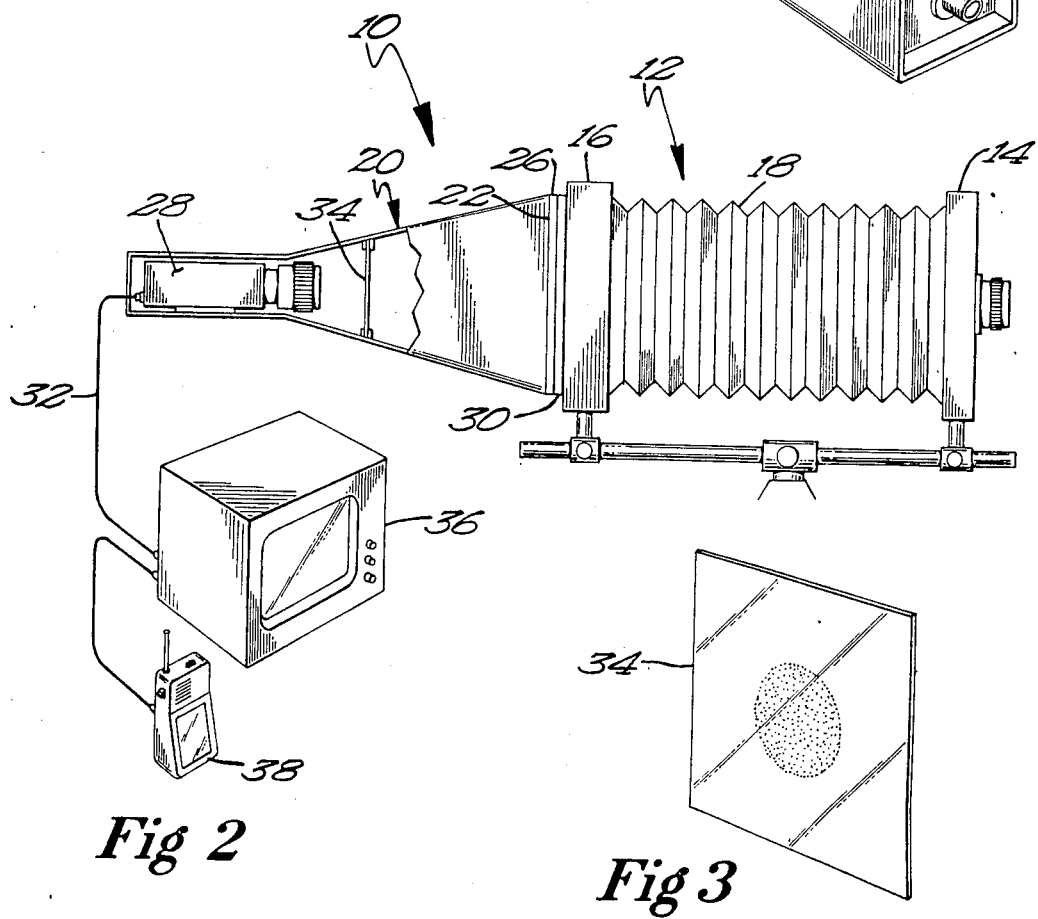
Fig 2
Fig 3

VIDEO VIEWFINDER SYSTEM

BACKGROUND

The present invention relates generally to photography, more particularly to viewfinder systems for cameras and more specifically to video viewfinder systems for cameras.

Especially in professional photography studios, precise setup of sets to be photographed is required. Prior to the present invention, a photographer must view a dim, upside down image on a camera back and frequently at an odd angle. Furthermore, often the photographer would then direct an assistant to arrange the objects on the set. Additionally, due to the somewhat imprecise nature of the the above, instant photographs were initially taken to simply check the scene arrangement prior to taking the final photograph versions. It can then be appreciated that prior to the present invention, setup was very time consuming, required two persons, and was further costly due to instant film expenses. Thus a need has arisen in photography for a viewfinder system where the photographer can view the setup with a correctly orientated, sharp image and simultaneously can personally make the set adjustments more accurately, quickly and easily and which substantially reduces instant photograph exposures.

SUMMARY

The present invention solves this and other needs and problems in photography by providing, in its most preferred form, a video viewfinder system including a viewfinder hood attached to a camera, with the viewfinder hood including a member upon which the primary image of the camera lens is formed. A video camera is further included in the viewfinder hood for aiming at the primary image of the camera lens. The video viewfinder system further includes a member for displaying a derived image from the video camera of the primary image allowing a photographer to view the primary image of the camera lens on the displaying member at locations remote from the camera.

In another aspect of the present invention, an anti-vignetting filter is provided which in its preferred form is reproduced photographically from a film negative original, which in turn is produced photographically as an out-of-focus image of a dark spot. In the video viewfinder system of the preferred form of the present invention, the anti-vignetting filter selectively absorbs outgoing light rays from the center of the primary image to the video camera for providing more uniform brightness of the derived image from its center to its edges.

In still another aspect of the present invention, the video viewfinder system of the present invention includes a fresnel lens associated with the primary image forming means shown in its preferred form as ground glass for concentrating the outgoing light rays from the primary image forming means to the video camera for providing more uniform brightness of the derived image from its center to its edges.

It is thus an object of the present invention to provide a novel video viewfinder system for cameras.

It is thus an object of the present invention to provide a novel photographically reproduced anti-vignetting filter.

It is further an object of the present invention to provide such a novel anti-vignetting filter which is reproduced photographically from a film negative original which in turn is produced photographically as an out-of-focus image of a dark spot.

It is further an object of the present invention to provide such a novel video viewfinder system including such a novel photographically reproduced anti-vignetting filter for providing more uniform brightness of the derived image from its center to its edges.

It is further an object of the present invention to provide such a novel video viewfinder system allowing a photographer to view a correctly orientated, sharp image formed by the camera lens.

It is further an object of the present invention to provide such a novel video viewfinder system allowing the photographer viewing the image formed by the camera lens to personally make set adjustments.

It is further an object of the present invention to provide such a novel video viewfinder system allowing more accurate, quick, and easier set adjustments.

It is further an object of the present invention to provide such a novel video viewfinder system which substantially reduces the need for instant photograph exposures.

It is further an object of the present invention to provide such a novel video viewfinder system which substantially reduces the time required for setup of photograph sets.

It is further an object of the present invention to provide such a novel video viewfinder system which allows the photographer to view the image formed by the camera lens at locations remote from the camera.

It is further an object of the present invention to provide such a novel video viewfinder system which does not require two persons for setup of photograph sets.

It is further an object of the present invention to provide such a novel video viewfinder system which allows the photographer to view the image formed by the camera lens in comfortable positions and independent of the camera position and orientation.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of an assembled viewfinder hood of a video viewfinder system according to the teachings of the present invention, with the cover being removed.

FIG. 2 shows a diagrammatic view of the video viewfinder system of FIG. 1.

FIG. 3 shows a perspective view of an anti-vignetting filter according to the teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A video viewfinder system according to the teachings of the present invention is shown in its preferred use with a camera in the drawings and is generally designated 10. Camera 12 generally includes a lens standard 14 and a rear standard 16 connected by light tight bellows 18. Rear standard 16 performs two purposes. First, standard 16 is designed to receive and hold in position film holders. Second, to allow focusing and scene setup, rear standard 16 receives a piece of ground glass on which an image is formed by the camera lens. This image, which is inverted, may then be viewed by the photographer.

Video viewfinder system 10 according to the teachings of the present invention includes a viewfinder hood 20 having a first end 22 and a second end 24. In a first preferred form of the present invention, first end 22 of viewfinder hood 20 is adapted to be removably received in rear standard 16 of camera 12.

Video viewfinder system 10 according to the teachings of the present invention further includes a ground glass 26 mounted in viewfinder hood 20 adjacent its first end 22 on which a primary image is formed by the camera lens. Video viewfinder system 10 according to the teachings of the present invention additionally includes a miniature video camera 28 mounted in viewfinder hood 20 adjacent its second end 24. Video camera 28 should include a closeup lens fixed at the proper focus distance to provide a view of the primary image focused on ground glass 26. In its most preferred form, video camera 28 is a Sony model XC-37 miniature CCD camera.

Video viewfinder system 10 may further include according to the teachings of the present invention a member 30 for providing more uniform brightness of the image formed on ground glass 26 from its center to its edges. In its most preferred form, member 30 is shown as a fresnel lens associated with ground glass 26 and may be mounted adjacent thereto or combined therewith. Fresnel lens 30 concentrates the outgoing light rays in the direction of the lens of video camera 28. It should then be appreciated that fresnel lenses have been utilized in some prior ground glass focusing screens of prior cameras; however, it is believed that fresnel lenses have not been utilized to provide more uniform brightness with a video camera in conjunction with a viewfinder system.

Video viewfinder system 10 may further include according to the teachings of the present invention a member 34 to also provide more uniform brightness of the image from its center to its edges. In its most preferred form, member 34 is shown as an anti-vignetting filter having gradated density from highly dense at the center to clear at a radial distance away from the center. Specifically, anti-vignetting filter 34 is provided to compensate for the phenomenon of lens fall off where the outward portions of an image are seen to be less bright due to the cosine error of seeing the light rays at an angle versus straight at the center. Placement of anti-vignetting filter 34 immediately in front of video camera 28 will selectively absorb light rays from the center of the primary image formed on ground glass 26, thus equalizing the brightness of the image. In its most preferred form, anti-vignetting filter 34 will be reproduced photographically from a film negative original, which in turn will be produced photographically as an out-of-focus image of a dark spot. On negative film, the dark spot will produce a gradated filter which is clear at the center, which in turn will reproduce filters on negative film which are dark in the center. It should then be appreciated that anti-vignetting filters have been used on prior cameras, particularly in aerial mapping cameras; however, it is believed that anti-vignetting filters have not been utilized to provide a more uniform brightness with a video camera in conjunction with a viewfinder system. Further it is believed that the method of manufacture described herein is novel and advantageous over prior anti-vignetting manufacture methods.

According to the teachings of the present invention, a cable 32 is electrically connected between video camera 28, a video monitor/power source 36, and a miniature video monitor 38. In its most preferred form, video monitor 36 is a standard sized, high resolution model giving a high quality image and video monitor 38 is a miniature unit which can be easily carried around the studio by the photographer. Video monitor 36 is modified to provide power for camera 28 from the monitor power supply. Both monitors 36 and 38 are set up to accept transparent overlay sheets on which the photographer can draw a frame to indicate the desired shape of the picture as an aid to composition.

Now that the construction of video viewfinder system 10 according to the teachings of the present invention have been set forth, the subtle features and the use of system 10 can be set forth and appreciated. In use, camera 12 may be set up at the set to be photographed in the normal manner. However, rather than utilizing a prior ground glass focusing screen, video viewfinder system 10 according to the teachings of the present invention may be utilized in its place. Specifically, first end 22 of viewfinder hood 20, according to the teachings of the present invention, may be positioned in rear standard 16 of camera 12. After power to video camera 28 has been supplied, the photographer may take miniature video monitor 38 to the set to be photographed. At that time, the photographer may personally arrange and adjust the set material by observing monitor 38. It can then be realized the set placement can be easily, quickly, and accurately made by the photographer personally without requiring the photographer to continuously run between the set and the camera or without requiring the photographer to relay commands to an assistant at the set.

After the set has been adjusted to his satisfaction, the photographer may then view the set through the larger screen monitor 36 to insure that the set meets with his satisfaction. It can then be realized that monitor 36 in one mode functions as the instant exposure photographs which were utilized prior to the present invention. It can then be realized that preview shots with instant film will be considerably reduced and this savings alone will provide a short payback period for video viewfinder system 10 according to the teachings of the present invention.

Furthermore, in the most preferred form of the present invention, video camera 28 is mounted in an inverted condition within viewfinder hood 20 of video viewfinder system 10. Thus, the image produced on monitors 36 and 38 will have a correct orientation in system 10 rather than inverted orientations as in prior ground glass focusing screens. It can then be realized that the correct orientation of the image in video viewfinder system 10 according to the teachings of the present invention substantially reduces false takes which were overlooked due to inverted image orientation of prior ground glass focusing screens.

Further, it can be appreciated that video viewfinder system 10 according to the teachings of the present invention allows the photographer to view the image formed by the camera lens at locations remote from camera 12. This is very advantageous since the photographer may move around the studio and is not restricted to the camera location as in prior ground glass focusing screens. Specifically, the image of monitors 36 and 38 may be easily viewed and not at odd angles as was common with prior ground glass focusing screens. Further, video viewfinder system 10 according to the teachings of the present invention allows camera 12 to be positioned at locations which are inaccessible, dangerous, or the like for a photographer and may include a microwave relay link between video camera 28 and monitors 36 and 38. Likewise, video viewfinder system 10 according to the teachings of the present invention allows the photographer to view the images formed on monitors 36 and 38 in comfortable positions such as sitting and does not require the photographer to crouch over camera 12 or to be in similar tiresome positions.

After the set to be photographed has been set up to the photographer's satisfaction, video viewfinder system 10 according to the teachings of the present invention may be removed from camera 12 and replaced with a film holder in a manner analoguous to the standard operation of camera 12. It can then be appreciated that video viewfinder system 10 according to the teachings of the present invention substantially reduces the time required for setup of sets to be photographed and reduces the amount of effort required by the photographer.

Now that the basic teachings of the present invention have been explained, many extensions and variations will be obvious to one having ordinary skill in the art. For example, in its most preferred form, although video viewfinder system 10 according to the teachings of the present invention is shown in use with a camera 12 having a removeable film holder and focusing screens, it should be appreciated that video viewfinder system 10 according to the teachings of the present invention may be utilized with reflex-type cameras having internal mirrors which create separate viewfinder and film focal planes. In such applications, video viewfinder system 10 according to the teachings of the present invention may be constructed integral into the focusing screen assembly if desired.

Similarly, although described in connection with setup of sets in photographic studios, video viewfinder system 10 according to the teachings of the present invention may be utilized in other applications. For example, video and photographic cameras could share the same optical systems utilizing video viewfinder system 10 according to the teachings of the present invention in security applications. Thus, the low resolution of video could be augmented by a photographic shot when something critical was seen and the views would be insured to correspond due to the sharing of the same optical systems. Likewise, video viewfinder system 10 according to the teachings of the present invention may be utilized in aerial photography. The use of video viewfinder system 10 according to the teachings of the present invention would then eliminate the grueling work of a photographer crouching over a viewfinder of a floor mounted camera for hours at a time in a bouncing, small plane.

Although in its most preferred form video camera utilized in video viewfinder system 10 according to the teachings of the present invention is black and white due to its compact size and low weight, it is anticipated that video cameras of other types such as color models may be utilized in video viewfinder system 10 according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Viewfinder system for use with a camera having a lens for forming an image of a photographic set to be photographically recorded on film, with the viewfinder system comprising, in combination: a viewfinder hood having a first end and a second end, with the viewfinder hood being attached to the camera adjacent to its first end; a ground glass located in the viewfinder hood adjacent its first end for forming a primary image by the camera lens; a video camera located in the viewfinder hood adjacent to its second end for aiming at the primary image formed on the ground glass by the camera lens; at least one video monitor for displaying a derived image of the primary image from the video camera, with the video camera and the video monitor being interconnected by means for transmitting signals between the video camera and the video monitor allowing a photographer to view the primary image formed by the camera lens on the video monitor at locations remote from the camera; a fresnel lens associated with the ground glass for concentrating the outgoing light rays from the ground glass to the video camera for providing more uniform brightness of the derived image from its center to its edges; and an anti-vignetting filter located intermediate the video camera and the ground glass, with the anti-vignetting filter having graduated density from highly dense at the center of the filter to clear at a radial distance away from the center for selectively absorbing the outgoing light rays from the ground glass to the video camera for providing more uniform brightness of the derived image from its center to its edges.

2. The video viewfinder system of claim 1 wherein the anti-vignetting filter is reproduced photographically from a film negative original, which in turn is produced photographically as an out-of-focus image of a dark spot.

3. The video viewfinder system of claim 1 wherein the camera has a rear standard for removably receiving and holding a holder for the film; and wherein the first end of the viewfinder hood includes means for removable receipt in the rear standard of the camera allowing the video viewfinder system to be removably received and held in the rear standard in a similar manner as the film holder.

4. Viewfinder system for use with a camera having a lens for forming an image of a photographic set to be photographically recorded on film and having a rear standard for removably receiving and holding a holder for the film, with the viewfinder system comprising, in combination: a viewfinder hood having a first end and a second end, with the first end of the viewfinder hood including means for removable receipt in the rear standard of the camera allowing the video viewfinder system to be removably received and held in the rear standard in a similar manner as the film holder; means adjacent the first end of the viewfinder hood for forming a primary image by the camera lens; a video camera located in the viewfinder hood adjacent to its second end for aiming at the primary image formed on the image forming means by the lens of the camera; and means for displaying a derived image of the primary image from the video camera, with the video camera and the displaying means being interconnected by means for transmitting signals between the video camera and the displaying means allowing a photographer to view the primary image formed by the camera lens on the displaying means at locations remote from the camera.

5. The video viewfinder system of claim 4 wherein the primary image means is a ground glass mounted in the viewfinder hood adjacent to its first end.

6. Viewfinder system for use with a camera having a lens for forming an image of a photographic set to be photographically recorded on film, with the viewfinder system comprising, in combination: a viewfinder hood having a first end and a second end, with the viewfinder hood being attached to the camera adjacent to its first end; means adjacent the first end of the viewfinder hood for forming a primary image by the camera lens; a video camera located in the viewfinder hood adjacent to its second end for aiming at the primary image formed on the image forming means by the lens of the camera; means for displaying a derived image of the primary image from the video camera; and means for providing more uniform brightness of the derived image from its center to its edges, with the video camera and the displaying means being interconnected by means for transmitting signals between the video camera and the displaying means allowing a photographer to view the primary image formed by the camera lens on the displaying means at locations remote from the camera.

7. The video viewfinder system of claim 6 wherein the uniform brightness providing means comprises: means for concentrating the outgoing light rays from the primary image forming means to the video camera.

8. The video viewfinder system of claim 7 wherein the concentrating means comprise a fresnel lens associated with the primary image forming means.

9. The video viewfinder system of claim 7 wherein the uniform brightness providing means comprises: means for selectively absorbing the outgoing light rays from the primary image forming means to the video camera.

10. The video viewfinder system of claim 9 wherein the selectively absorbing means comprises an anti-vignetting filter having graduated density from highly dense at the center of the filter to clear at a radial distance away from the center.

11. The video viewfinder system of claim 10 wherein the anti-vignetting filter is reproduced photographically from a film negative original, which in turn is produced photographically as an out-of-focus image of a dark spot.

12. The video viewfinder system of claim 6 wherein the uniform brightness providing means comprises: means for selectively absorbing the outgoing light rays from the primary image forming means to the video camera.

13. The video viewfinder system of claim 12 wherein the selectively absorbing means comprises an anti-vignetting filter having graduated density from highly dense at the center of the filter to clear at a radial distance away from the center.

14. The video viewfinder system of claim 13 wherein the anti-vignetting filter is reproduced photographically from a film negative original, which in turn is produced photographically as an out-of-focus image of a dark spot.

15. The video viewfinder system of claim 6 wherein the primary image means is a ground glass mounted in the viewfinder hood adjacent to its first end.

16. The video viewfinder system of claim 6 wherein the derived image displaying means comprises a standard-sized, high resolution video monitor.

17. The video viewfinder system of claim 6 wherein the derived image displaying means comprises a miniature video monitor which can be easily carried by the photographer.

18. The video viewfinder system of claim 6 wherein the signal transmitting means comprises cable electrically connected between the video camera and the displaying means.

19. The video viewfinder system of claim 6 wherein the video camera is mounted upside down in the viewfinder hood to reinvert the inverted primary image found on the image forming means by the camera lens.

20. The video viewfinder system of claim 6 wherein the camera has a rear standard for removably receiving and holding a holder for the film; and wherein the first end of the viewfinder hood includes means for removable receipt in the rear standard of the camera allowing the video viewfinder system to be removably received and held in the rear standard in a similar manner as the film holder.

* * * * *